US010400836B2

(12) United States Patent
Müller et al.

(10) Patent No.: US 10,400,836 B2
(45) Date of Patent: Sep. 3, 2019

(54) METHOD FOR PRODUCING A CARRIER BODY HAVING A DAMPER MASS FOR CHANGING THE VIBRATION FOR A BRAKE LINING OF A DISK BRAKE (71) Applicant: Federal-Mogul Bremsbelag GmbH, Glinde (DE)

(72) Inventors: Christian Müller, Reinbek (DE); Ilhami Karatas, Glinde (DE)

(73) Assignee: Federal-Mogul Bremsbelag GmbH, Glinde (DE)

(*) Notice: Subject to any disclaimer, the term of this patent is extended or adjusted under 35 U.S.C. 154(b) by 0 days.

(21) Appl. No.: 15/030,921

(22) PCT Filed: Oct. 20, 2014

(86) PCT No.: PCT/EP2014/072449
§ 371 (c)(1),
(2) Date: Apr. 21, 2016

(87) PCT Pub. No.: WO2015/059098
PCT Pub. Date: Apr. 30, 2015

(65) Prior Publication Data
US 2016/0252148 A1 Sep. 1, 2016

(30) Foreign Application Priority Data
Oct. 21, 2013 (DE) .......... 10 2013 111 594

(51) Int. Cl.
*B23P 11/00* (2006.01)
*F16D 65/00* (2006.01)
(Continued)

(52) U.S. Cl.
CPC .......... *F16D 65/0043* (2013.01); *B21J 15/00* (2013.01); *B21K 25/00* (2013.01);
(Continued)

(58) Field of Classification Search
CPC .............. F16D 65/0006; F16D 65/092; F16D 65/0018; F16D 2250/0023; F16D 65/0043;
(Continued)

(56) References Cited

U.S. PATENT DOCUMENTS 4,048,708 A * 9/1977 Briles ............. B21J 15/02
29/509
5,042,137 A * 8/1991 Speller, Sr. ........... B21J 15/10
29/524.1
(Continued)

FOREIGN PATENT DOCUMENTS

DE 2914629 A1 10/1980
DE 3315758 A1 10/1984
(Continued)

OTHER PUBLICATIONS

Lotter et al., Montage in der industriellen Produktion.-.2. Auflage. Berlin Heidelberg:Springer-Verlag, 2012 (-).228,229-.-ISBN 978-3-642-29060-2.
(Continued)

*Primary Examiner* — Jun S Yoo
(74) *Attorney, Agent, or Firm* — Porter, Wright, Morris & Arthur LLP (57) ABSTRACT In order to further improve a method for producing a carrier body for a friction lining of a disk brake, in such a way that the rigid connection between a friction-lining carrier plate of the carrier body and a first damper mass of the carrier body is more robust, a force directed perpendicularly towards the first pin-shaped project is exerted, according to the invention, by means of pressing until the first pin-shaped projection is compressed to such an extent that the first pin-shaped projection forms, within the first hole, a form closure with an inner wall of the first hole in some regions.

12 Claims, 6 Drawing Sheets (51) Int. Cl.
*F16D 65/092* (2006.01)
*B21K 25/00* (2006.01)
*B21J 15/00* (2006.01)
*F16D 65/02* (2006.01)

(52) U.S. Cl.
CPC ..... *F16D 65/0006* (2013.01); *F16D 65/0018* (2013.01); *F16D 65/092* (2013.01); *F16D 2065/1344* (2013.01); *F16D 2250/0023* (2013.01); *Y10T 29/49945* (2015.01)

(58) Field of Classification Search
CPC ........ F16D 2065/1344; Y10T 29/49945; B21J 15/02; F16B 19/06; B23P 13/00; B21D 39/03
See application file for complete search history.

(56) References Cited

U.S. PATENT DOCUMENTS

| | | | | |
|---|---|---|---|---|
| 5,231,747 | A | * | 8/1993 | Clark ........................ B21J 15/10 227/152 |
| 5,557,835 | A | | 9/1996 | Brandts |
| 5,855,054 | A | * | 1/1999 | Rivera ..................... B21J 15/02 29/243.54 |
| 6,089,062 | A | | 7/2000 | Zemp |
| 8,794,397 | B2 | * | 8/2014 | Crippa ................ F16D 65/0018 188/250 B |
| 2004/0134725 | A1 | | 7/2004 | Bosco et al. |
| 2005/0067235 | A1 | | 3/2005 | Pham et al. |
| 2012/0024643 | A1 | | 2/2012 | Crippa et al. |
| 2012/0210550 | A1 | * | 8/2012 | Swinford ................. B21J 15/02 29/243.525 |
| 2016/0298684 | A1 | * | 10/2016 | Itagaki ................... F16C 19/06 |

FOREIGN PATENT DOCUMENTS

| | | |
|---|---|---|
| DE | 4326676 A1 | 2/1994 |
| DE | 68917118 T2 | 1/1995 |
| DE | 19846463 A1 | 5/2000 |
| DE | 10305308 A1 | 4/2004 |
| DE | 10331052 A1 | 1/2005 |
| EP | 1710460 A1 | 10/2006 |
| EP | 1307665 B1 | 10/2008 |
| EP | 2446165 B1 | 4/2013 |
| JP | 2002-323020 A | 11/2002 |
| JP | 2010-531422 A | 9/2010 |
| WO | 2009/001381 A1 | 12/2008 |
| WO | 2015/059097 A1 | 4/2015 |

OTHER PUBLICATIONS

The Search Report from the priority German Application No. 10 2013 111 594.2, dated Jul. 28, 2014.
The International Search Report from the corresponding PCT Application No. PCT/EP2014/072449, dated Sep. 24, 2015.

* cited by examiner

METHOD FOR PRODUCING A CARRIER BODY HAVING A DAMPER MASS FOR CHANGING THE VIBRATION FOR A BRAKE LINING OF A DISK BRAKE

The invention relates to a method for producing a carrier body for a brake pad of a disk brake, wherein at least one first damper mass is rigidly arranged on a friction pad carrier plate of the carrier body for the purposes of changing the vibration.

PRIOR ART

It is known from the prior art for mass elements to be attached to a friction pad carrier plate for brake pads for the purposes of changing the vibration and thus reducing noise.

EP 1 307 665 B1 has disclosed a brake block for a disk brake, which brake block has a plate for carrying a friction pad, wherein the brake block has a device which is rigidly assigned to the plate in order to form a single rigid body and in order to vary the mass of at least one part of the plate in order to realize an inertia of the brake block which substantially prevents vibrations of the brake block that could cause noise of the brake disk during braking operations.

DE 10 331 052 A2 describes a brake pad backplate for a brake pad of a vehicle disk brake. Here, a damper mass is provided on the brake pad backplate for the purposes of changing the vibration, wherein, on a carrying section for the brake pad, there is integrally formed at least one elongate arm, which arm has an end connected to the carrying section and has a free end, runs adjacent to the carrying section without making contact as far as a free end, and lies in the main plane of extent of the brake pad backplate.

WO 2009/001 381 A1 has disclosed a brake block for disk brakes, which brake block has a plate which serves as a support for a friction material layer, wherein at least one load is applied to the plate and fastened thereto by way of clamping. The load changes the mass of at least one part of the plate in order to realize an inertia of the brake block which substantially prevents the vibrations of the brake block during braking operations. The load has at least one abutting surface which is suitable for abutting against the edge of the plate and thereby defining a restriction of the rotation of the load about an axis of rotation of the disk.

PRESENTATION OF THE INVENTION

Problem, Solution, Advantages

The problem addressed by the present invention is that of further improving a method for producing a carrier body for a friction pad of a disk brake, in such a way that the rigid connection between the friction pad carrier plate of the carrier body and a damper mass of the carrier body is more robust in relation to the solutions proposed in the prior art, and withstands greater loads.

Said problem is solved by way of a method for producing a carrier body for a brake pad of a disk brake according to claim 1.

After the execution of the production method according to the invention, the carrier body has a friction pad carrier plate for holding a friction pad, and at least one first damper mass which is connected rigidly to the friction pad carrier plate and which serves for changing the vibration. According to the invention, the production method has the following steps:

a) inserting a first, pin-like projection of the first damper mass into a first hole of the friction pad carrier plate, wherein the first pin-like projection protrudes from a first side surface of the first damper mass, b) pushing the first damper mass against the friction pad carrier plate in order that the first side surface of the first damper mass bears against a first side surface of the friction pad carrier plate, c) exerting a force, which is directed vertically onto the first pin-like projection, by way of a pressing action until the first pin-like projection has been upset to such an extent that it forms, within the first hole, a form fit with an internal wall of the first hole at least in regions.

Furthermore, the production method according to the invention provides for the force, which is directed vertically onto the first pin-like projection to be exerted by way of a pressing action until a rigid connection exists between the friction pad carrier plate and the first damper mass.

Here, the friction pad carrier plate may be composed of any suitable material, and is of substantially plate-like form. For the production of a brake pad, a friction pad, or friction pad material, is applied to the first side surface of the friction pad carrier plate.

Through the provision of a damper mass which is rigidly connected to the friction pad carrier plate, the vibration can be changed, and thus noises during braking operations can be reduced. In this way, the natural frequency of the device is changed. In the context of this invention, a damper mass is to be understood to mean a mass element composed of any suitable material which is fastened not to multiple objects, or rigidly connected to multiple objects, but is merely rigidly connected to the friction pad carrier plate of the carrier body.

In the context of this invention, a rigid connection is to be understood to mean a connection between friction pad carrier plate and the damper mass, wherein the damper mass is not rotatable or pivotable about an axis but is arranged fixedly on the friction pad carrier plate in a specified and predefined position. Thus, the rigid connection between the friction pad carrier plate and the first damper mass can be severed only by the action of extreme or very high force.

A pin-like projection which protrudes from the first side surface of the first damper mass is to be understood as a projection of elongate form. It may be for example a cylindrical, conical or polygonal elongate projection. An elongate projection is to be understood to mean a projection which has a length greater than a maximum width.

The head of the pin-like projection is to be understood to mean the end of the pin-like projection. Thus, the head of the pin-like projection is arranged in the region of a face side of the first pin-like projection, wherein said face side is averted from the first side surface of the first damper mass. Thus, the pin-like projection extends from the first side surface of the first damper mass to the end or the head of said projection. The head of the pin-like projection is formed integrally with the pin-like projection. The pin-like projection is preferably formed in one piece with the damper mass. The head of the pin-like projection is formed by the face-side region of the pin-like projection. Before the exertion of a force on the pin-like projection, or before the production of the rigid connection between the friction pad carrier plate and the first damper mass, the face side of the pin-like projection constitutes said head. During the exertion of a force on the pin-like projection, said head is deformed, and has the shape of a flathead and/or the shape of a mushroom head. Here, after the exertion of the force, said head has a greater diameter or a greater maximum width than the rest of the pin-like projection. Said head is thus deformed by the exertion of the force so as to be expanded in terms of circumference.

Since the first pin-like projection is inserted into the first hole of the friction pad carrier plate such that the head of the first pin-like projection protrudes out of the first hole, the first pin-like projection is formed so as to be longer than the depth of the first hole. Provision is preferably made whereby, before the exertion of a force on the first pin-like projection and after the insertion of the first pin-like projection into the first hole, the first pin-like projection protrudes out of the first hole not only by way of its face side but also by more than that. After the exertion of the force on the first pin-like projection, the latter still protrudes out of the first hole by way of its head. The first pin-like projection is preferably inserted into the first hole of the friction pad carrier plate by virtue of the friction pad carrier plate being placed onto the first damper mass with its first pin-like projection protruding upward.

The method step "pushing of the first damper mass against the friction pad carrier plate" is to be understood to mean that, using a suitable means, either the first damper mass is pushed onto the friction pad carrier plate and/or the friction pad carrier plate is pushed onto the first damper mass. For example, it would be possible, by way of a holding-down means, for the friction pad carrier plate to be pushed onto the first damper mass, or for the friction pad carrier plate that has been placed onto the first damper mass to be pushed down.

In the context of the present invention, the expression "vertically onto the first pin-like projection" is to be understood to mean that a force is exerted on the head of the first pin-like projection, that is to say onto that end of the pin-like projection which protrudes out of the first hole of the friction pad carrier plate after insertion into the first hole. In this way, the first pin-like projection is upset in its longitudinal direction by way of a pressing action. This means that the first pin-like projection has a shorter length after the exertion of the vertically directed force than before the exertion of the vertically directed force. Furthermore, the first pin-like projection has, at least in regions, a greater width or thickness after the exertion of the vertically directed force than before the exertion of the vertically directed force. In particular in the regions of the increased width or thickness, the first pin-like projection is, after the exertion of the vertically directed force, in contact by way of a form fit with the internal wall of the first hole of the friction pad carrier plate.

In the context of the present invention, "exerting a force by way of a pressing action" is to be understood to mean that the force is exerted not just abruptly, such as is the case for example with riveting, but by way of a pushing or pressing action on the first pin-like projection. By virtue of the fact that the force is effected not abruptly but rather by way of a pushing or pressing action and is directed vertically onto the first pin-like projection, the material of the first pin-like projection can be upset in a more effective manner. Thus, after the exertion of the vertically directed force, the first pin-like projection fills out the first hole of the friction pad carrier plate more effectively, and forms a better and in particular greater form fit component between the first pin-like projection and the internal wall of the first hole. Owing to the better form fit, or owing to the greater form fit component between the first pin-like projection and the internal wall of the first hole, it is possible to realize a more robust connection between the friction pad carrier plate and the first damper mass. A carrier body produced in this way thus withstands higher loads during operation.

Provision is preferably made for the force directed vertically onto the first pin-like projection to be exerted by way of a pressing action until the first pin-like projection has been upset to such an extent that it forms, within the first hole, a fully circumferential form fit with the internal wall of the first hole in at least one region. For example, the vertically directed force is exerted on the first pin-like projection until, in the region of the exit of the first hole, that is to say that region of the first hole which directly adjoins the head of the first pin-like projection, a fully circumferential form fit is formed within the first hole between the first pin-like projection and the internal wall of the first hole. Furthermore, the vertically directed force could be exerted on the first pin-like projection until, within the first hole, a fully circumferential form fit is formed between the first pin-like projection and the internal wall of the first hole in the region of the center and/or the start of the pin-like projection.

In particular by virtue of the fact that the form fit between the first pin-like projection and the internal wall of the first hole is of fully circumferential form at least in regions, the rigid connection between the first damper mass and the friction pad carrier plate is more robust and withstands higher loads.

Furthermore, provision is preferably made for the force directed vertically onto the first pin-like projection to be exerted by way of a pressing action until the first pin-like projection has been upset to such an extent that it forms, within the first hole, a form fit with the internal wall of the first hole substantially over the entire depth of the first hole. Here, provision is particularly preferably made for the vertically directed force to be exerted until the first pin-like projection forms a form fit with the internal wall of the first hole both over the full circumference and over the entire depth of the first hole. Thus, provision is particularly preferably made whereby, after the exertion of the vertically directed force on the first pin-like projection, a form fit is formed between the first pin-like projection and the internal wall of the first hole in the entire region within the first hole.

The force directed vertically onto the first pin-like projection by way of a pressing action is preferably exerted with a substantially constant intensity over the entire pressing duration. Provision is thus preferably made whereby the vertically directed force is exerted on the first pin-like projection with a predefined intensity and is kept constant over the entire pressing duration. By way of such a uniform exertion of the force on the first pin-like projection, it is possible to avoid material damage, in particular in the region of the head of the first pin-like projection. For example, it is possible in this way to prevent the material from fraying, or from cracking in the region of the head of the first pin-like projection, after the exertion of the force. In this way, too, the rigid connection between the friction pad carrier plate and the first damper mass is made more robust.

The force directed vertically onto the first pin-like projection is preferably exerted by way of a pressing action over a pressing duration of 0.5 s to 10 s, particularly preferably of 0.5 s to 5 s, and very particularly preferably of 1 s to 2.5 s. Provision is thus preferably made whereby the force is exerted on the first pin-like projection for considerably longer than in the case of striking, for example in the case of riveting. It can be achieved in this way that the material of the first pin-like projection is deformed, or upset, in a gentler and more uniform manner. It is thus possible to prevent the material of the first pin-like projection from being damaged, for example from becoming frayed or cracking, during the exertion of the vertically directed force.

Provision is preferably furthermore made whereby the force directed vertically onto the first pin-like projection is exerted by way of a pressing action with an intensity of 10 kN to 80 kN, particularly preferably with an intensity of between of 20 kN and 60 kN, and very particularly preferably with an intensity of 25 kN to 50 kN. For example, it would be possible for the vertically directed force to be exerted with a constant intensity of 30 kN to 35 kN and over a pressing duration of 1 s to 2.5 s.

To produce a rigid connection between the friction pad carrier plate and the first damper mass, provision is preferably made whereby only a force directed vertically onto the first pin-like projection is exerted, by way of a pressing action. Provision is thus preferably made whereby, in addition to the vertically oriented force, no force oriented in any other way is exerted on the first pin-like projection. For example, to produce a rigid connection between the friction pad carrier plate and the first damper mass, no force directed sidewardly or obliquely onto the head of the first pin-like projection is exerted. Furthermore, no provision is made for rotational movements of the pushing means, or of a pressing head, or rotational movements of the first damper mass to be performed during the exertion of the vertically directed force. Thus, it is preferably the case that only a force directed vertically onto the first pin-like projection is provided, by way of a pressing action, for the production of a rigid connection between the friction pad carrier plate and the first damper mass.

It is preferably the case that, during the exertion of the force directed vertically onto the first pin-like projection, no tumbling motion of the pressing head or of the damper mass is provided.

Furthermore, provision is preferably made whereby the force directed vertically onto the first pin-like projection is exerted by way of a pressing action by means of a pressing head. Here, the pressing head has a pressure surface which, during the pressing process, or during the exertion of the force on the first pin-like projection, faces toward the head of the first pin-like projection. The pressing head is pushed or pressed by way of its pressure surface vertically onto the head of the first pin-like projection. Here, the head of the first pin-like projection constitutes the end region, that is to say the face-side region, which is averted from the first side surface of the first damper mass.

The pressure surface of the pressing head is preferably substantially smooth. This means that the pressure surface of the pressing head has no significant unevennesses or projections or recesses. Furthermore, it is preferable for the pressure surface of the pressing head to constitute a planar surface. It is achieved in this way that, after the exertion of the force on the first pin-like projection, the head of the pin-like projection has a likewise substantially planar face-side surface. Alternatively, the pressure surface of the pressing head may have a concave shape, and it is achieved in this way that, after the exertion of the force on the first pin-like projection, the head of the first pin-like projection has an upwardly domed form, or a convex form.

The pressure surface of the pressing head is, during the exertion of the force, preferably oriented parallel to the head, that is to say parallel to the face side of the first pin-like projection. Thus, the pressure surface of the pressing head is oriented parallel to that face side of the first pin-like projection which is averted from the first side surface of the first damper mass. Furthermore, provision is thus preferably made whereby the pressure surface of the pressing head is, during the exertion of the force, oriented substantially parallel to the first side surface of the first damper mass and/or parallel to the first side surface of the friction pad carrier plate.

It is preferably the case that an advancing travel between the pressing head, that is to say between the pressure surface of the pressing head, and the head of the first pin-like projection of less than 100 cm is provided. This means that, before exerting the force on the pin-like projection, the pressing head is moved from a rest position in the direction of the head of the first pin-like projection, wherein, in said rest position, the spacing between the pressure surface of the pressing head and the head of the first pin-like projection is less than 100 cm. The advancing travel is particularly preferably less than 50 cm, or very particularly preferably less than 25 cm. The advancing travel may highly preferably be less than 10 cm or less than 5 cm. Thus, the pressing process differs from a striking movement not only by way of the longer pressing duration but also by way of a shorter advancing travel, or shorter spacing between the pressure surface of the pressing head and the head of the first pin-like projection before the introduction of the force onto the head of the first pin-like projection.

It is furthermore preferable for the force directed vertically onto the first pin-like projection to be exerted by way of a pressing action until the first pin-like projection bears by way of its head partially against a first bevel in the region of a first edge of the first hole.

The first edge of the first hole is an encircling edge, which delimits the first hole, in the region of the transition between a second side surface of the friction pad carrier plate and the hole inner side, preferably the internal wall, of the first hole.

In the context of the present invention, a bevel is to be understood to mean a chamfering or rounding of the first edge. After insertion of the first pin-like projection into the first hole of the friction pad carrier plate and fastening of the first damper mass to the friction pad carrier plate, the head of the first pin-like projection preferably bears at least partially against the first bevel. Thus, the head of the first pin-like projection preferably bears at least regionally against the first bevel. For example, the mushroom-shaped or flat head of the first pin-like projection bears by way of its underside and/or edge region against the first bevel after the exertion of the force on the first pin-like projection.

Owing to the provision of a first bevel in the region of the first edge of the first hole in the friction pad carrier plate, it is possible to realize an improved form fit between the damper mass and the friction pad carrier plate. In this way, the connection between the first damper mass and the friction pad carrier plate is made more robust. The material of the pin-like projection in the region of the head thereof is not damaged, or is not so quickly and easily damaged, during the fastening process. For example, it is thus possible for cracking in the region of the head of the first pin-like projection to be prevented or at least reduced.

In particular, through the provision of a first bevel in the region of the first edge of the first hole of the friction pad carrier plate, it is also possible, during the exertion of a vertically directed force onto the end of the first pin-like projection, to realize improved and more intense upsetting in the region of the center and of the start of the first pin-like projection. Also, in this way, the form fit between friction pad carrier plate and the first damper mass, or of the first pin-like projection within the first hole, that is to say the form fit between the first pin-like projection and the internal wall of the first hole, can be intensified.

The first bevel may be in the form of a chamfering or rounding of the first edge of the first hole of the friction pad carrier plate. It is preferably the case that a chamfering, very particularly preferably a fully circumferential chamfering, of the first edge of the first hole of the friction pad carrier plate is formed by way of the first bevel. Through the provision of the first bevel, the first hole has a larger opening in said region than in the interior of the first hole.

Furthermore, provision is preferably made whereby the first bevel is at a first angle with respect to the internal wall of the first hole, wherein the first angle is between 10° and 80°. The first angle between the first bevel and the internal wall of the first hole particularly preferably lies between 25° and 60°, and very particularly preferably between 40° and 50°. For example, the first angle could be 45°. Here, the first angle is preferably formed so as to be substantially constant over the full circumference around the first hole, or over the full circumference along the first edge of the first hole.

The first bevel preferably projects into the first hole over a first depth, wherein the first depth corresponds to less than 50% of the total depth of the first hole. The first depth over which the first bevel projects into the first hole preferably corresponds to less than 40%, very particularly preferably less than 30%, of the total depth of the first hole. It would for example be possible for the first bevel to project into the first hole over a first depth of less than 20% of the total depth of the first hole.

The depth of the first hole corresponds substantially to the thickness of the friction pad carrier plate in the region of the first hole. Thus, the first hole is provided so as to extend all the way through the friction pad carrier plate. The depth of the first hole is to be understood to mean the total depth or length of the first hole through the friction pad carrier plate. The first depth over which the first bevel projects into the hole is to be understood to mean the spacing between a plane which lies on the second side surface of the friction pad carrier plate and the end of the first bevel within the first hole along a central axis of the first pin-like projection. Thus, the first depth is to be understood to mean the spacing, projecting vertically into the first hole, to the end of the first bevel.

The first pin-like projection may be of any suitable form. The first pin-like projection is preferably of conical form. Here, the cross section of the first pin-like projection decreases, as viewed from the first side surface of the first damper mass, toward the head of the first pin-like projection. It is particularly preferably the case that the cross section decreases constantly and linearly, as viewed from the first side surface of the first damper mass, toward the head of the first pin-like projection. Provision is thus preferably made whereby the first pin-like projection is at least regionally of conical form, or at least regionally has the shape of a truncated cone. Here, the cross section of the first pin-like projection may be of circular, oval or polygonal form.

It is preferably the case that at least one indentation is formed in the first bevel. Here, provision is particularly preferably made whereby the at least one indentation is arranged around the first hole over the full circumference. Furthermore, provision is preferably made whereby the indentation is arranged in encircling fashion in the first bevel around the first hole. Furthermore, it is possible for multiple mutually spaced-apart indentations to be arranged in ring-shaped fashion in the first bevel around the first hole.

Furthermore, provision is preferably made for the internal wall of the first hole to lie at a second angle with respect to the first side surface of the first damper mass, wherein the second angle lies between 75° and 105°, particularly preferably between 80° and 100°, and very particularly preferably between 85° and 95°. For example, the second angle in the region of a second edge of the first hole may be of substantially right-angled form. Thus, the entry region of the first hole in the region in which the first side surface of the first damper mass bears against the first side surface of the friction pad carrier plate is preferably of substantially right-angled form, wherein the exit region of the first hole, that is to say in the region of the first edge of the first hole, is chamfered by way of the first bevel.

The first pin-like projection preferably protrudes by way of its head out of the first hole over a first length, wherein the first length corresponds to less than 25%, particularly preferably less than 15%, very particularly visibly less than 10%, of the total depth, or length, of the first hole. Normally, a friction pad carrier plate for a brake pad of a disk brake for motor vehicles has a thickness of between 5 mm and 15 mm. For example, it would be possible for the first hole to have a total depth of 10 mm, wherein the first pin-like projection protrudes by way of its head out of the first hole only over a first length of 1 mm to 2 mm. The first length, over which the first pin-like projection protrudes by way of its head out of the first hole, is determined after the exertion of the force on the first pin-like projection, or after the production of the rigid connection between friction pad carrier plate and the first damper mass.

The first pin-like projection may have any suitable cross section. For example, the first pin-like projection may have a polygonal, for example triangular, tetragonal, pentagonal or hexagonal cross section. Furthermore, it would be possible for the first pin-like projection to have a circular or oval cross section. Here, provision is preferably made whereby the shape of the first hole, or the cross section of the first hole, has a cross section corresponding to the cross section of the first pin-like projection. The maximum width of the pin-like projection is in this case preferably slightly smaller than the minimum opening width of the first hole. Thus, it is possible for the first pin-like projection to be inserted into the first hole without deformation, or without relatively great action of force.

Furthermore, provision is preferably made whereby the first damper mass is pushed against the friction pad carrier plate throughout the entire pressing duration. Thus, the first damper mass is pressed against the friction pad carrier plate even during the exertion of the vertically directed force on the first pin-like projection. It is achieved in this way that, even after the production of the rigid connection between the friction pad carrier plate and the first damper mass, the first damper mass is at least regionally in contact by way of its first side surface with, or at least regionally bears by way of its first side surface against, the first side surface of the friction pad carrier plate. In this way, the rigid connection between the first damper mass and the friction pad carrier plate is once again made more robust.

Furthermore, provision is preferably made whereby a second damper mass is rigidly connected to the friction pad carrier plate for the purposes of changing the vibration.

The second damper mass is preferably designed in the same way as the first damper mass. Here, the friction pad carrier plate has a second hole through which the second pin-like projection, specifically the pin-like projection of the second damper mass, is inserted. All of the abovementioned features relating to the first damper mass or the first hole in the friction pad carrier plate are also provided for the second damper mass or the second hole of the friction pad carrier plate. For example, the friction pad carrier plate may have a second bevel in the region of the first edge of the second hole, which second bevel is, after the insertion of the second pin-like projection, at least regionally connected to the head of the second pin-like projection.

Furthermore, all of the method steps described above for the production of the carrier body, or for the production of a rigid connection between the friction pad carrier plate and the first damper mass, are also provided for the production of a rigid connection between the friction pad carrier plate and the second damper mass.

Furthermore, according to the invention, a carrier body for a brake pad of a disk brake, produced in accordance with the abovementioned production method, is provided.

PREFERRED EMBODIMENTS OF THE INVENTION

Figure 1A:
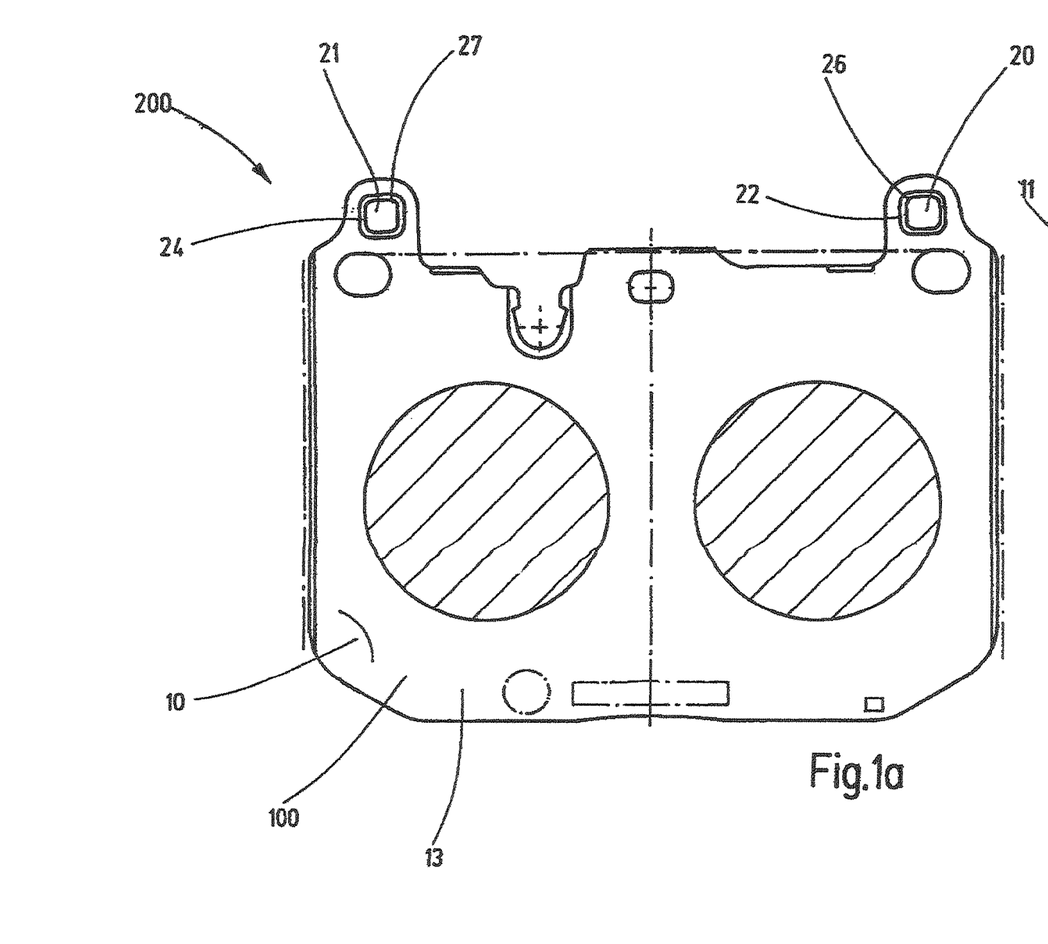
FIG. 1a is a schematic illustration of a brake pad having a friction pad carrier plate and holes arranged therein for receiving damper masses.
Figure 1B:
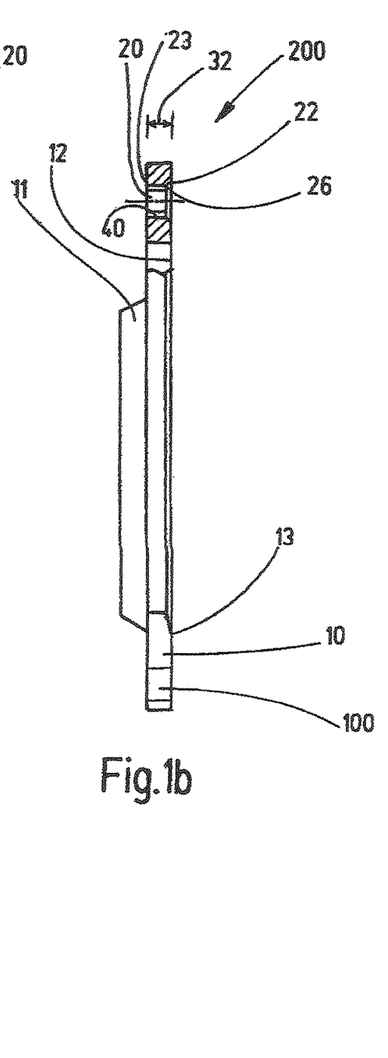
FIG. 1b shows a cross section through a brake pad having a friction pad carrier plate and having a friction pad arranged on the friction pad carrier plate.

FIGS. 1a and 1b show a brake pad 200 in a front view and in cross section. The brake pad 200 has a carrier body 100, wherein only the friction pad carrier plate 10 of the carrier body 100 is shown, without damper masses 14, 15 attached thereto. Furthermore, the brake pad 200 has a friction pad 11 arranged on the first side surface 12 of the friction pad carrier plate 10. At its two upper corner regions, the friction pad carrier plate 10 has in each case one hole, specifically a first hole 20 and a second hole 21, for receiving the pin-like projections 18, 19 of the two damper masses 14, 15. The exit opening of the first hole is in this case delimited by a first encircling edge 22 on the second side surface 13 of the friction pad carrier plate 10. In the region of said first edge 22 of the first hole 20, there is arranged a first bevel 26. As a result, the first edge 22 of the first hole 20 is formed with an encircling chamfer. The friction pad carrier plate 10 has a thickness 32 which, in the region of the first hole 20 and the second hole 21, corresponds to the respective depth 33, 34 of the corresponding hole 20, 21. The first bevel 26 and the second bevel 27 project into the first hole 20 and into the second hole 21 respectively over a first depth 37 and over a second depth 38 respectively. The first bevel 26 lies at a first angle 35 with respect to the internal wall 40 of the first hole 20. The second bevel 27 lies at a second angle 36 with respect to the internal wall 41 of the second hole 21.

Figure 2A:
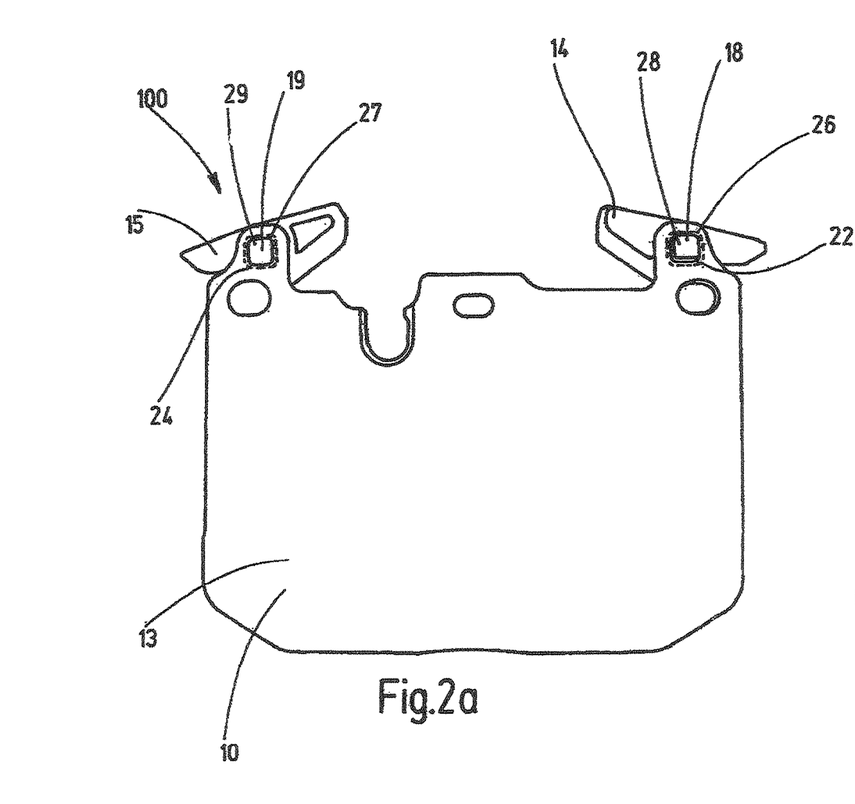
FIG. 2a shows a perspective view of a carrier body having a friction pad carrier plate and two damper masses arranged thereon.
Figure 2B:
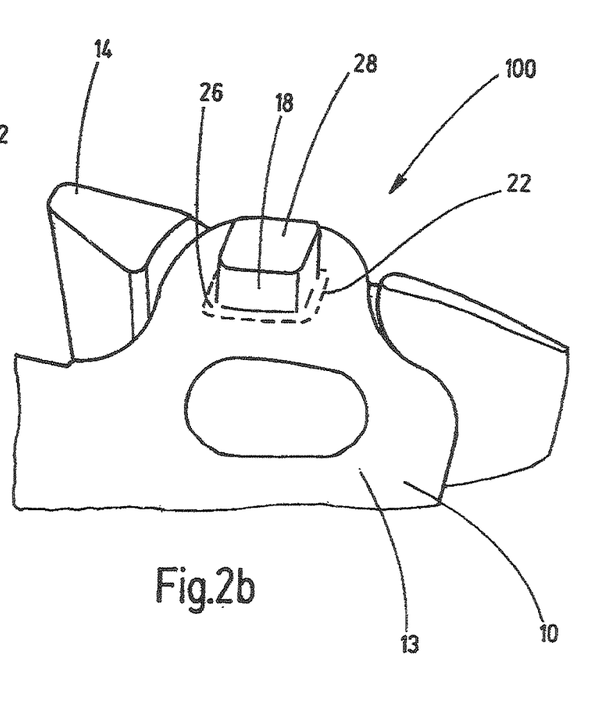
FIG. 2b shows a perspective view of a detail of a friction pad carrier plate and of the damper mass connected thereto.
Figure 3A:
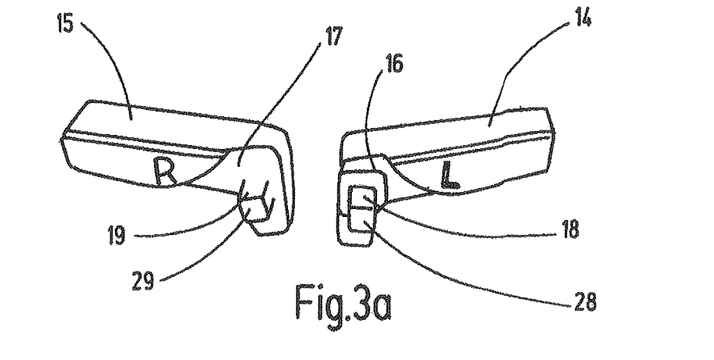
FIGS. 3a-3d show different shapes of damper masses.
Figure 3B:
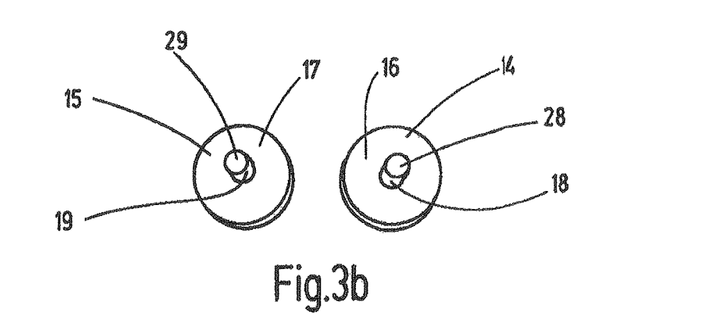
Figure 3C:
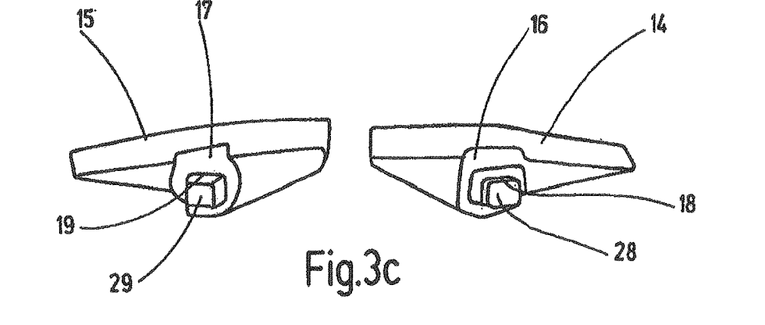
Figure 3D:
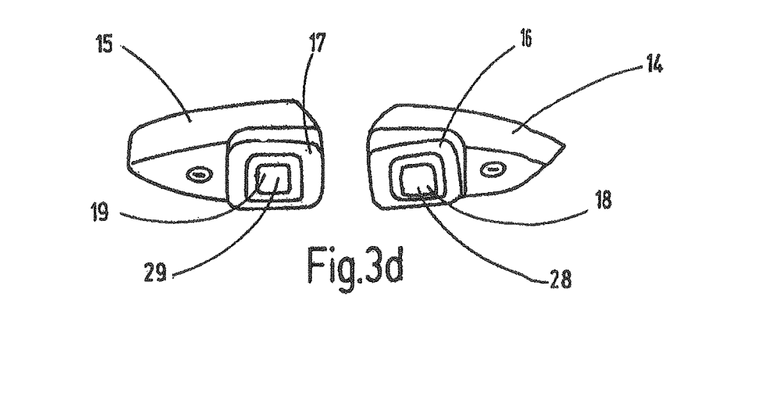

FIGS. 2a and 2b show a perspective view of a carrier body 100 with a friction pad carrier plate 10 and two damper masses 14, 15 fastened rigidly thereto. Here, the first damper mass 14 is arranged with its first pin-like projection 18 in the first hole 20 of the friction pad carrier plate 10. As can be seen from FIGS. 2a and 2b, the end or the head 28 of the first pin-like projection 18 protrudes out of the first hole 20.

In order to connect the two damper masses 14, 15 fixedly and rigidly to the carrier plate 10, a force is exerted vertically on the first pin-like projection 18 and on the second pin-like projection 19 respectively by way of a pressing action. Here, both the first pin-like projection 18 and the second pin-like projection 19 are upset and, in particular in the region of the head 28 of the first pin-like projection 18 and in the region of the head 29 of the second pin-like projection 19 respectively, are deformed such that the respective head 28, 29 of the two pin-like projections 18, 19 bear at least partially against the respective bevel 26, 27 in the region of the first edge 22 of the first hole 20 and in the region of the first edge 24 of the second hole 21 respectively. The respective pin-like projections 18, 19 protrude out of the respective hole 20, 21 over a first length 42 and over a second length 43 respectively after the exertion of the force, or after the production of the rigid connection of the two damper masses 14, 15 to the friction pad carrier plate 10. In this regard, reference is also made to FIG. 4. FIGS. 2a and 2b show the stage before the exertion of the force, or before the production of the rigid connection. In FIGS. 2a and 2b, the two damper masses 14, 15 have been inserted by way of their pin-like projections 18, 19 into the holes 20, 21.

FIGS. 3a to 3d show various shapes of damper masses 14, 15. Regardless of the shape of the respective damper mass 14, 15, each damper mass 14, 15 has a first and second pin-like projection 18, 19 respectively, which projections protrude from the first side surface 16 of the first damper mass 14 and from the second side surface 17 of the second damper mass 15 respectively. Here, the pin-like projections 18, 19 may be of substantially circular (cf. FIG. 3b) or polygonal (cf. FIGS. 3a, 3c and 3d) form.

Figure 4:
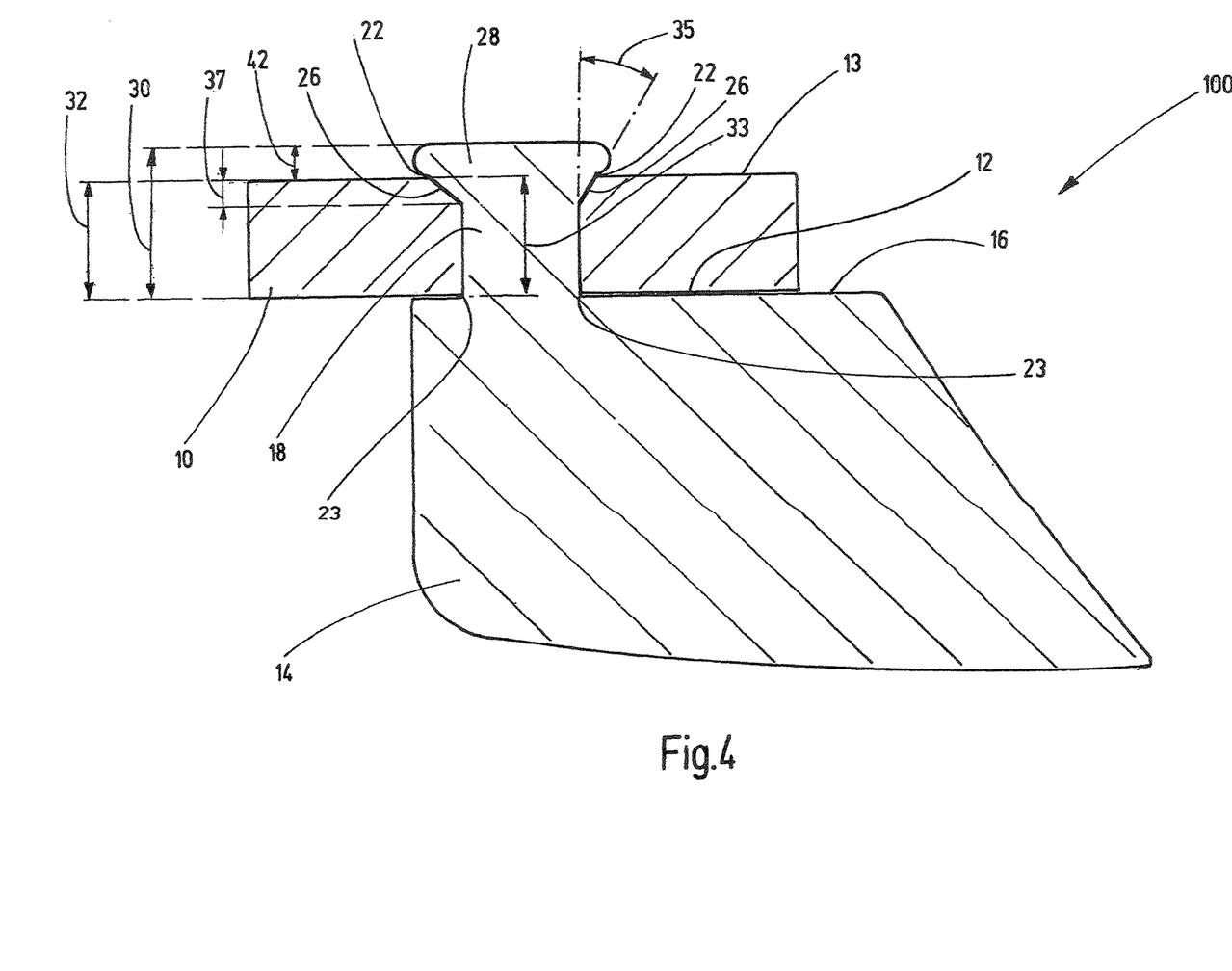
FIG. 4 is a sectional illustration of a detail of the connection of a damper mass to the friction pad carrier plate.

The respective first side surface 16, 17 of the two damper masses 14, 15 is connected to, or bears against, the first side surface 12 of the friction pad carrier plate 10 after the connection of the two damper masses 14, 15 to the friction pad carrier plate 10. FIG. 4 shows, as a sectional illustration, the fastening region between the friction pad carrier plate 10 and a first damper mass 14. Here, the first pin-like projection 18 of the first damper mass 14 has been inserted into the first hole 20 of the friction pad carrier plate 10. The first damper mass 14 bears by way of the first side surface 16 of the first damper mass 14 against the first side surface 12 of the friction pad carrier plate 10. By virtue of a force directed vertically onto the first pin-like projection 18 being exerted by way of a pressing action, a rigid connection has been realized between the friction pad carrier plate 10 and the first damper mass 14. The first pin-like projection 18 has been upset over the entire depth 33 of the first hole 20, such that, within the first hole 20, it is possible to see a form fit, formed over the full circumference and over the entire depth 33 of the first hole 20, between the first pin-like projection 18 and the internal wall 40 of the first hole 20. The first pin-like projection 18 protrudes by way of its head 28 out of the first hole 20 over a first length 42.

Furthermore, the head 28 of the first pin-like projection 18 bears regionally directly against the first bevel 26 in the region of the first edge 22 of the first hole 20.

In the region of the first hole 20, the friction pad carrier plate 10 has a thickness 32 which corresponds to the depth 33 of the first hole 20. The first bevel 26 projects into the first hole 20 over a first depth 37. Furthermore, the first bevel forms a first angle 35 with respect to the internal wall 40 of the first hole 20.

Figure 5:
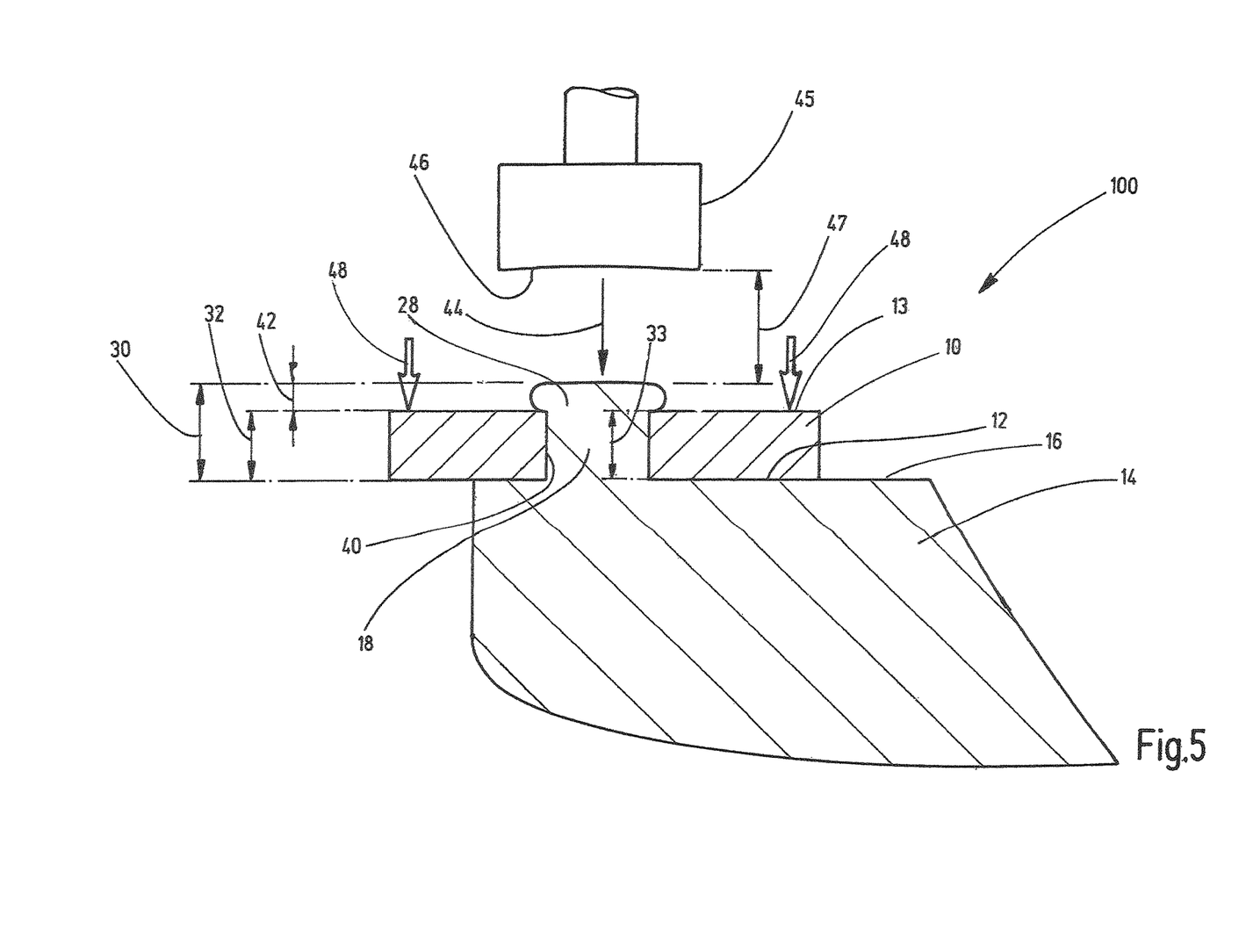
FIG. 5 is a sectional illustration of a detail of the connection of a damper mass to the friction pad carrier plate.
Figure 6:
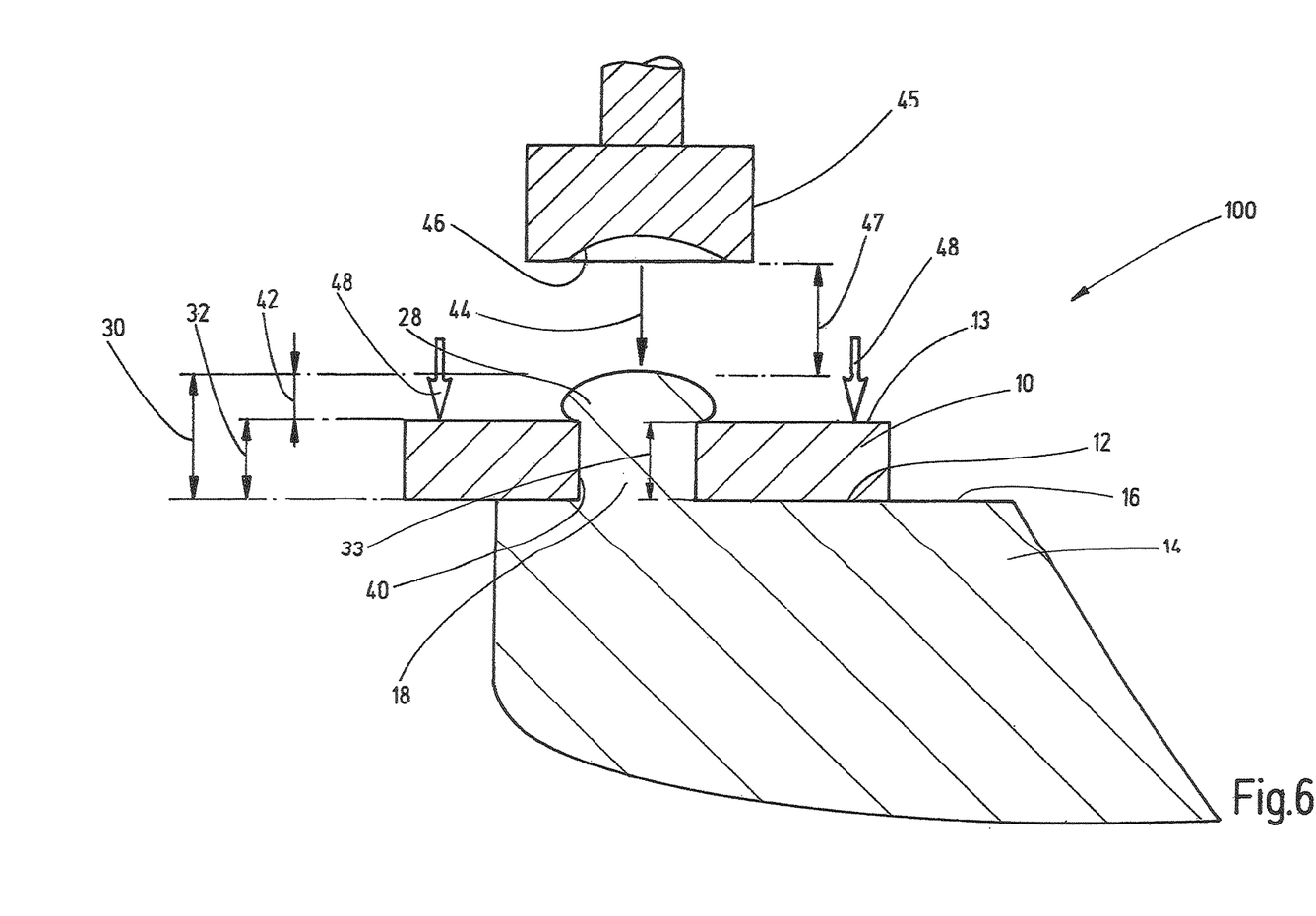
FIG. 6 is a further sectional illustration of a detail of the connection of a damper mass to the friction pad carrier plate.

FIGS. 5 and 6 show the fastening region between the friction pad carrier plate 10 and a first damper mass 14, as has already been shown in FIG. 4 as a sectional illustration. By contrast to the illustration in FIG. 4, no bevel 26, 27 is provided in the region of the first hole 20 of the friction pad carrier plate 10 or in the region of the first edge 22 of the first hole 20. The angle between the second side surface 13 of the brake pad carrier plate 10 and the internal wall 40 of the first hole 20 is thus right-angled.

The method for producing the carrier body 100, or the method steps for the rigid fastening of a damper mass 14, 15 to a friction pad carrier plate 10, is provided both for an embodiment with bevels 26, 27 and an embodiment without bevels 26, 27. Below, the method step of the pressing, or the exertion of a force 44 directed vertically onto the first pin-like projection 18, will be described by way of example on the basis of FIGS. 5 and 6, without a bevel 26, 27.

In FIGS. 5 and 6, as is also the case in FIG. 4, a rigid connection between the friction pad carrier plate 10 and the first damper mass 14 is already shown. That is to say, the head 28 of the first pin-like projection 18 has already been deformed by the force 44 exerted on the first pin-like projection 18. Furthermore, owing to the upset first pin-like projection 18, the form fit between the internal wall 40 of the first hole 20 and the first pin-like projection 18 can be seen within the first hole 20.

For the production of the carrier body 100 for a brake pad 200 of a disk brake 300, for this purpose, the first pin-like projection 18 of the first damper mass 14 has been inserted into the first hole 20 of the friction pad carrier plate 10. In the subsequent step, the first damper mass 14 has been pressed, by way of a holding-down means 48, against the friction pad carrier plate 10, such that the first side surface 16 of the first damper mass 14 bears against the first side surface 12 of the friction pad carrier plate 10.

During the pressing action by way of the holding-down means 48, a force 44 directed vertically onto the first pin-like projection 18 has been exerted by way of a pressing head 45. For this purpose, by way of the pressure surface 46 of the pressing head 45, a constant force has been exerted, over a predefined pressing duration, on the face side, or the head 28, of the first pin-like projection 18. For this purpose, the pressing head 45 has been moved out of its rest position, with an advancing travel 47, vertically toward the face-side region or the head 28 of the first pin-like projection 18, and then the force 44 directed vertically onto the first pin-like projection 18 has subsequently been exerted by way of a pressing action. The advancing travel 47 corresponds to the spacing between the pressure surface 46 of the pressing head 45 and the head 28 of the first pin-like projection 18 in the rest position, that is to say before the initiation of the exertion of force.

FIG. 5 shows a pressing head 45 with a pressure surface 46, wherein the pressure surface 46 is a smooth and planar surface. Thus, after the exertion of the force 44 on the head 28 of the first pin-like projection 18, the head 28 of the first pin-like projection 18 is formed, in terms of its surface, as a substantially smooth planar surface.

FIG. 6 shows a pressing head 45 with a pressure surface 46, wherein the pressure surface 46 has a concave shape. Thus, the pressing head 45 has an inwardly domed pressure surface 46. After the exertion of the force 44 on the head 28 of the first pin-like projection 18, the outer surface of the head 28 of the first pin-like projection 18 thus has a convex, that is to say outwardly domed, shape.

LIST OF REFERENCE NUMERALS

100 Carrier body
200 Brake pad
300 Disk brake
10 Friction pad carrier plate
11 Friction pad
12 First side surface of the friction pad carrier plate
13 Second side surface of the friction pad carrier plate
14 First damper mass
15 Second damper mass
16 First side surface of the first damper mass
17 First side surface of the second damper mass
18 First pin-like projection
19 Second pin-like projection
20 First hole
21 Second hole
22 First edge of the first hole
23 Second edge of the second hole
24 First edge of the second hole
25 Second edge of the second hole
26 First bevel
27 Second bevel
28 Head of the first pin-like projection
29 Head of the second pin-like projection
30 Length of the first pin-like projection
31 Length of the second pin-like projection
32 Thickness of the friction pad carrier plate
33 Depth of the first hole
34 Depth of the second hole
35 First angle
36 Second angle
37 First depth
38 Second depth
39 Indentation
40 Internal wall of the first hole
41 Internal wall of the second hole
42 First length
43 Second length
44 Force
45 Pressing head
46 Pressure surface of the pressing head
47 Advancing travel
48 Holding-down means

The invention claimed is:

1. A method for producing a carrier body for a brake pad of a disk brake, wherein the carrier body has a friction pad carrier plate for holding a friction pad, and at least one first damper mass which is connected rigidly to the friction pad carrier plate and which serves for changing the vibration, the method comprising:

a) inserting a first, pin-like projection formed integrally with the first damper mass into a first hole of the friction pad carrier plate, wherein the first pin-like projection protrudes from a first side surface of the first damper mass, b) pushing the first damper mass against the friction pad carrier plate in order that the first side surface of the first damper mass bears against a first side surface of the friction pad carrier plate, and c) after the first damper mass bears against the first side surface of the friction pad carrier plate in step b), exerting a force, which is directed vertically onto the first pin-like projection, by way of a pressing action of a pressing head on a head of the first pin-like projection which protrudes from the first hole of the friction pad carrier plate to upset the first pin-like projection to such an extent that, at least in regions, the width of the first pin-like projection within the first hole is increased, and the regions of increased width of the pin-like projection form, within the first hole, a form fit with an internal wall of the first hole and a rigid connection is formed between the friction pad carrier plate and the first damper mass, wherein in the pressing action, the pressing head is moved toward the head of the first pin-like projection over an advancing travel of less than 10 cm in order to exert the force directed vertically onto the head of the pin-like projection, the pressing action has a duration of 1 s to 2.5 s and an intensity of 25 kN to 50 kN, the first damper is pressed against the first side surface of the friction pad carrier plate before and after the pressing duration, and the pressing force is the only force applied to the first pin-like projection to upset the first pin-like projection.

2. The method of claim 1, wherein, in step c), the first pin-like projection is upset to such an extent that the regions of increased width of the pin-like projection form, within the first hole, a fully circumferential form fit with the internal wall of the first hole in one region.

3. The method of claim 1, wherein, in step c), the first pin-like projection is upset to such an extent that the regions of increased width of the pin-like projection form, within the first hole, a form fit with an internal wall of the first hole over an entire depth of the first hole.

4. The method of claim 1, wherein, in step c), the force directed vertically onto the head of the first pin-like projection is exerted by way of the pressing action with a constant intensity over the entire pressing duration.

5. The method of claim 1, wherein, in step c), the pressing action has an intensity of 30 kN to 35 kN.

6. The method of claim 1, wherein, for the production of a rigid connection between the friction pad carrier plate and the first damper mass, only the force directed vertically onto the first pin-like projection is exerted, by way of a pressing action, and no rotational movement is performed during the exertion of the force, and no force directed sidewardly onto the first pin-like projection is exerted.

7. The method of claim 1, wherein the pressure surface of the pressing head is a smooth and/or planar surface, or wherein the pressure surface of the pressing head has a concave shape.

8. The method of claim 1, wherein the pressure surface of the pressing head is, during the exertion of the force, oriented parallel to the head of the first pin-like projection.

9. The method of claim 1, wherein the pressure surface of the pressing head is moved toward the head of the first pin-like projection over an advancing travel of less than 5 cm in order to then exert the force directed vertically onto the head of the pin-like projection by way of the pressing action.

10. The method of claim 1, wherein, in step c), the force directed vertically onto the head of the first pin-like projection is exerted by way of the pressing action until the first pin-like projection bears by way of its head partially against a first bevel in the region of a first edge of the first hole.

11. The method of claim 1, wherein a second damper mass is rigidly connected to the friction pad carrier plate for the purpose of changing the vibration.

12. A carrier body for a brake pad of a disk brake, produced according to the method of claim 1.

* * * * *

UNITED STATES PATENT AND TRADEMARK OFFICE
CERTIFICATE OF CORRECTION

PATENT NO. : 10,400,836 B2
APPLICATION NO. : 15/030921
DATED : September 3, 2019
INVENTOR(S) : Christian Müller et al.

It is certified that error appears in the above-identified patent and that said Letters Patent is hereby corrected as shown below:

On the Title Page

Item (30), change "102013111594" to --102013111594.2--.

Signed and Sealed this
Twelfth Day of November, 2019

Andrei Iancu
*Director of the United States Patent and Trademark Office*